United States Patent [19]

Kao

[11] 4,157,837
[45] Jun. 12, 1979

[54] BACK AND STROLL CARRIER

[76] Inventor: David T. Kao, 2415 Heather Way, Lexington, Ky. 40503

[21] Appl. No.: 858,081

[22] Filed: Dec. 6, 1977

[51] Int. Cl.² .................. B62B 7/12; A47D 13/02
[52] U.S. Cl. ........................... 280/30; 224/155; 224/161
[58] Field of Search ............ 280/30; 224/6, 8 A, 224/9

[56] References Cited

U.S. PATENT DOCUMENTS

| 2,576,356 | 11/1951 | Peterson | 280/642 |
|---|---|---|---|
| 2,670,216 | 2/1954 | Leonard | 280/47.25 |
| 2,846,233 | 8/1958 | Burg | 280/30 |
| 3,097,773 | 7/1963 | Cunningham | 224/6 |
| 3,365,210 | 1/1968 | Patterson | 280/642 |
| 3,390,893 | 7/1968 | MacLaren | 280/39 |
| 3,421,670 | 1/1969 | Hansson | 224/6 |
| 3,550,997 | 12/1970 | Strand | 280/30 |
| 3,556,546 | 1/1971 | Garner | 280/36 |
| 3,653,681 | 4/1972 | Virtue | 280/642 |
| 3,713,568 | 1/1973 | Sloan | 224/6 |
| 3,944,241 | 3/1976 | Epelbaum | 280/30 |
| 3,984,115 | 10/1976 | Miller | 280/30 |

Primary Examiner—Joseph F. Peters, Jr.
Assistant Examiner—Donn McGiehan
Attorney, Agent, or Firm—Birch, Stewart, Kolasch & Birch

[57] ABSTRACT

A device comprising a side frame configuration with versatile utility to be used as a child carrier attachable to a person's back, as a base supported baby seat, as a stroller or as a baby resting bed when the frame configuration is angularly moved to provide for such different uses. Also an extension frame is included as a part of the side frames and is coactively pivoted and latched to the side frame configuration to facilitate each of the above-mentioned uses of the device.

5 Claims, 5 Drawing Figures

BACK AND STROLL CARRIER

BACKGROUND OF THE INVENTION

1. Field of the Invention

The present invention relates to combined child supporting and carrying equipment having versatile utility. Specifically, the invention relates to a novel frame configuration to cooperate and coact with a child supporting open top flexible bag or pouch formed with a seat portion, a back section and a front section with spaced leg receiving openings for a child or baby.

2. Description of Prior Art

Heretofore, there have been developed various child carrying back-attached devices, strollers or baby seats, such as shown for example in prior U.S. Pat. No. 2,670,216 to Leonard; U.S. Pat. No. 2,721,603 to Faulconer; U.S. Pat. No. 3,097,773 to Cunningham; U.S. Pat. No. 3,421,670 to Hansson; and U.S. Pat. No. 3,984,115 to Miller. However, none of these prior art devices provide overall versatile utility in a single device. In other words, none of these patents disclose a single device which can function as a back-pack carrier, a chair, a stroller, and a bed.

SUMMARY OF THE INVENTION

Accordingly, an object of this invention is to provide a novel frame for child supporting and carrying devices, whereby several versatile uses of the device are performed by simple angular movements of the frame with the baby seat mounted therein from substantially vertical-to-tilted-to substantially horizontal positions to provide for a greater plurality of functional uses than heretofore efficiently possible.

Another object is to eliminate any relatively more complex folding of frame parts, such as are required with the prior art devices to accomplish any of the foregoing several uses when desired.

Briefly, the useful novel aspects of this invention reside in the formation of the side frame structures into a modified figure eight configuration. The head or top portion of each frame is formed from resilient yieldable tubes or rods having extended linear resiliently yieldable arms to support the baby seating pouch therebetween. The pouch includes spaced openings for the baby occupant's legs which face away from the cross sections of the figure eight frames, so that the feet and legs of the child are free of the respective frame portions in most all positions of use.

A U-shape frame to provide a top handle portion and spaced legs pivotally secured adjacent each end to a portion of one of the spaced side frame structures is provided. This U-shape frame has its respective leg ends swingably pivoted on pins or bolts in a hinge part on each of the respective side frame structures so as to be movable to at least three selected positions. In a storage position the handle is folded against the frame, see FIG. 1. In this storage position the device of the present invention can be used as a back-pack facilitated by a pair of shoulder straps coupled to the frame. In another position the handle may be pivoted to a selected angle with respect to the frame for supporting the device in an upright position as a chair or baby seat, see FIG. 2. In still another position the handle is fully extended from the frame to permit pushing of the device as a stroller, see FIG. 3. Also, in another position a fully extended position of the handle as in FIG. 4, the device can be placed in a substantially horizontal position for use as a bed with the upper loop of the respective side frames engaged with a flat base or a suitable support surface.

BRIEF DESCRIPTION OF THE DRAWINGS

With the foregoing objects and advantages and other novel features which will become apparent as the invention is fully understood, the same resides in the novelty of construction, combination and arrangement of parts hereinafter described in detail and distinctly claimed in conjunction with the accompanying drawings, wherein:

DETAILS OF THE INVENTION

Figure 1:
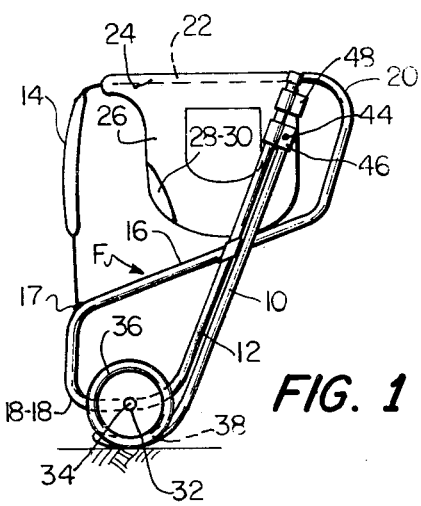
FIG. 1 is a side elevational view of one form of the invention in position for use to be mounted by shoulder straps on the back of an adult carrier.

Referring to FIG. 1 with the extension frame 10 folded down along the inner leg 12 of the figure eight frames F, there is shown the device of the present invention arranged for carrying a child when strapped on the back of a person. Each frame F is identical and has a bottom loop 18 from its leg 12 to an outer leg 16 which continues into an upper loop 20 and thence to projecting arm 22.

Each side of the device is a mirror image of the other, that is to say, a duplicate of the other and includes shoulder straps 14 each suitably secured to the lower portion of the outer leg section 16 at fastener 17 of each respective side frame F. Also, each projecting arm 22 of each frame F extends outwardly from the top loop 20 and engages in an elongated fabric hem casing 24 formed on each side of the baby or flexible child support 26.

Thus, when a baby is placed in the flexible seating pouch 26 with its legs extended through and from openings 28 and 30 formed in the same and mounted by the straps 14 onto the back of an adult carrier, the device is made suitable for such suspended ambulatory use.

Figure 2:
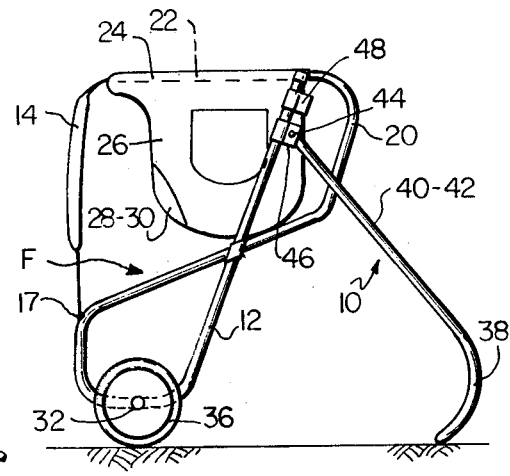
FIG. 2 is side elevational view of the invention set up for use as a walker or a stable baby seat on a flat support surface.
Figure 3:
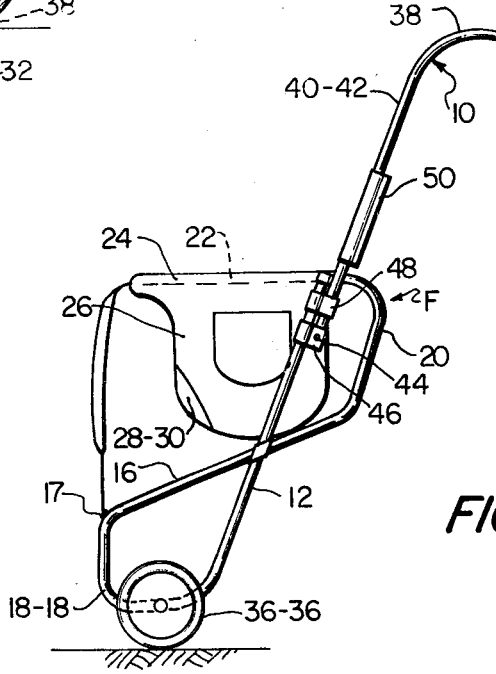
FIG. 3 is a side elevational view of the invention with the extension frame of FIG. 2 shown erected and extended for use of the device as a stroller.
Figure 4:
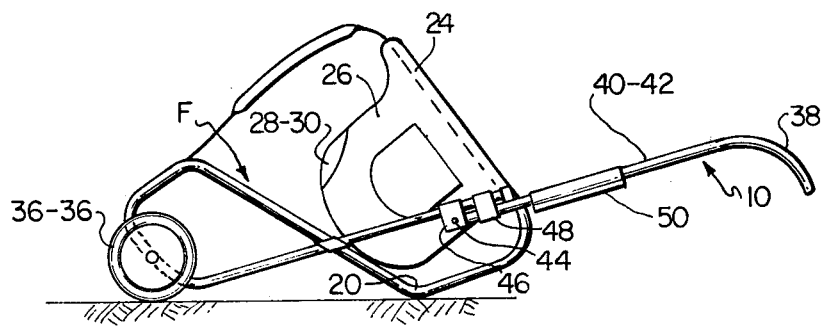
FIG. 4 is a side elevational view of the invention in a substantially horizontal position for use as a recliner or for use as a small baby bed.

Now in reference to FIGS. 1, 2, 3 and 4 of the drawings, each modified frame structure F includes an axle 32 the free ends 34 of which extend outboard of the frame F at the bottom loop 18 formed as a continuation thereof. Journaled on each free end 34 of the axle 32 is a suitable traction wheel 36. These wheels on the ends 34 of the axle 32 are used for surface engagement as shown in FIGS. 2, 3 and 4 to provide for use as a stable baby seat, or stroller or as a surface engaging member during any of such uses.

Figure 5:
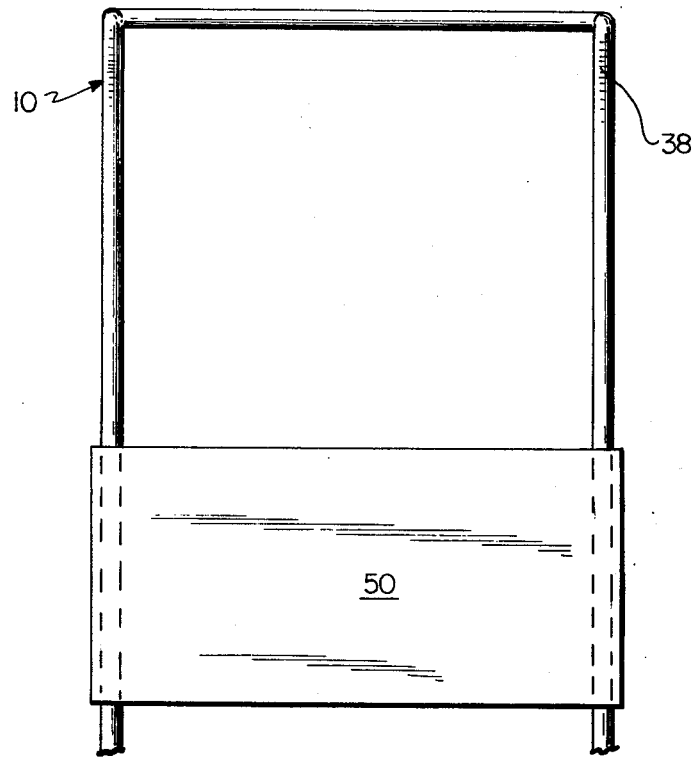
FIG. 5 is a partial plan view of the U-shaped extension frame of the present invention.

For example, when used, as shown in FIG. 2, as a generally fixed stable baby seat, the extension frame 10 is pivoted to the upper portion of each respective leg 12 of the frames F. This extension frame 10 is U-shaped and is in effect a wicket formation as illustrated in FIG. 5 with a downward directed arcuate head portion in the provision of a transverse handle bar 38. The end of each leg 40 and 42 of the extension frame 10 is connected by a pivot pin 44 in a hinge part 46 and may be releasably held by a spring clip 48 mounted on the leg 12 of the main frame F above said hinge part 46. Thus, the extension frame 10 may be swung on each respective pivot pin 44 of the hinge 46 from a spring latched position to an easel support position with the handle 38 in surface engagement when the device is used as a stable baby seat. See FIG. 2.

Next, in reference to FIG. 3 which illustrates the use of the device as a mobile baby stroller, the extension frame 10 is swung by its handle 38 upward from the respective hinge part 46 into an aligned position with the respective inner leg 12 of the respective modified figure eight frames F into the spring clip 48 suitably mounted on leg 12 to provide an extending handle 38. The device may then be freely moved about on the traction wheels 36—36 at the will of the person transporting a baby or child seated in the flexible seating pouch 26 depended from the spaced arms 22.

It is of further importance to note that the modified figure eight frames F are each made from one continuous tube or rod into such figure eight configuration and the extended arm 22 of each frame F while rigid are resilient enough to impart some desirable spring action from the weight of a baby seated in the pouch 26 depended upon the arms 22.

These resiliently flexible projecting arms 22 insert in the turned over hem casings 24 and serve similar purposes when used in any of the arrangements illustrated in FIGS. 1, 2 and 3.

Finally in reference to FIG. 4 illustrating the use of the device as a reclining baby bed or the like, each leg 40 and 42 of the extension frames 10 remains in linearly extended position to facilitate maneuverability, to therby tilt the device so the modified frames F are lowered to a substantially horizontal position of rest with the loop 20 in contact with a suitable stable surface. Preferably the baby's head will rest upon a protective transverse web 50, which web is suitably secured to each leg 40 and 42 of the U-shaped extension frame 10 with handle bar portion 38. Also, when lowered by the handle 38, the normally upper curved portion 20 of the modified main frames F rests upon a suitable flat support surface, the traction wheels 36—36 coactively also rest upon such surface for maximum stability, see FIG. 4.

This arrangement permits the baby to be fed or to rest or sleep in a satisfactory position without stress or strain.

Without further description it is believed to be readily apparent as to how the several positions of the device function to accomplish the results intended. Also it is believed that the many advantages of the present invention over the prior art are apparent from the embodiments illustrated.

It is to be expressly understood that the invention is not intended to be limited solely as illustrated in the drawings and various changes may be made in the combination and arrangement of the parts illustrated, as will now likely appear to others and those skilled in the art. For a definition of the scope of the invention, reference should be made to the appended claims.

What is claimed is:

1. A child supporting and carrying device comprising:
   a pair of rigid frame structures each being facsimile fabrications of each other, said respective frame structures each approximating a figure eight configuration having lower loop portions and upper loop portions;
   means for spacing said pair of rigid frame structures with said figure eight configurations substantially in parallel;
   means for supporting a seat for said child between said upper loops of said frame structures;
   wheel means connected to said lower loops of said frame structures; and
   handle means pivotally connected to said frame structures and adjustable to at least three positions including a storage position wherein said handle means is folded against said frame means, a support position at a selected angle to said frame for supporting said device as a chair, and a fully extended position away from said frame for use as bed or a stroller, with said upper loop portions resting on a horizontal support surface when said device functions as a bed.

2. The child supporting and carrying device of claim 1, including latch means for holding said handle means in said fully extended position.

3. The child supporting and carrying device of claim 2, further including strap means for fitting over the shoulders of a person to facilitate carrying of said device on the back of said person.

4. The child supporting and carrying device of claim 1, wherein said handle means comprises a U-shaped frame with the respective ends of said U-shaped frame pivotally connected to the respective rigid frame structures of said pair, whereby said U-shaped frame comprises said means for spacing said pair of rigid frame structures.

5. The child supporting and carrying device of claim 4, wherein there is further provided a web of flexible material extending across said U-shaped frame for supporting the head of said child.

* * * * *